United States Patent [19]

Watanabe et al.

[11] Patent Number: 5,214,629
[45] Date of Patent: May 25, 1993

[54] OPTICAL DISC HAVING A HIGH-SPEED ACCESS CAPABILITY AND READING APPARATUS THEREFOR

[75] Inventors: Hitoshi Watanabe, Ibaraki; Takeshi Maeda, Kokubunji, both of Japan

[73] Assignees: Hitachi Maxell, Ltd., Osaka; Hitachi, Ltd., Tokyo, both of Japan

[21] Appl. No.: 484,409

[22] Filed: Feb. 26, 1990

[51] Int. Cl.$^5$ .............................................. G11B 7/00
[52] U.S. Cl. .............................. 369/44.26; 369/44.34; 369/275.3
[58] Field of Search ..................... 369/275.3, 109, 32, 369/44.26, 44.34, 50

[56] References Cited

U.S. PATENT DOCUMENTS

| | | | |
|---|---|---|---|
| 4,779,253 | 10/1988 | Getreuer et al. | 369/44.26 X |
| 4,843,601 | 6/1989 | Eguchi et al. | 369/44.26 |
| 4,929,917 | 5/1990 | Yokogawa | 360/27 X |
| 4,951,275 | 8/1990 | Saitoh et al. | 369/44.34 X |

FOREIGN PATENT DOCUMENTS 58-108043 6/1983 Japan.
61-260426 11/1986 Japan.
62-143232 6/1987 Japan.
1-263964 10/1989 Japan.

OTHER PUBLICATIONS

"High Speed Access Method of Optical Disk Memory" Optical Memory Symposium, Dec. 18, 1986.
"Sample Access", SPIE, vol. 695, Optical Mass Data Storage II, pp. 160–164, 1986.

Primary Examiner—Robert L. Richardson
Attorney, Agent, or Firm—Birch, Stewart, Kolasch & Birch

[57] ABSTRACT

An optical disc for a sample servo type optical disc system. Servo areas disposed periodically on each of tracks of the optical disc are sequentially offset relative to those on the adjacent tracks as viewed in the radial direction by a predetermined distance. An apparatus used for signal read-out from the optical disc comprises a circuit for detecting a servo signal originating in servo pits from a detection signal output from a photodetector, a circuit for generating a clock signal synchronized with the servo signal, a counter for outputting a count value representative of the counted clocks at the timing of the servo signal, and a circuit for generating a light spot velocity signal from the count value.

7 Claims, 10 Drawing Sheets

FIG. 2D
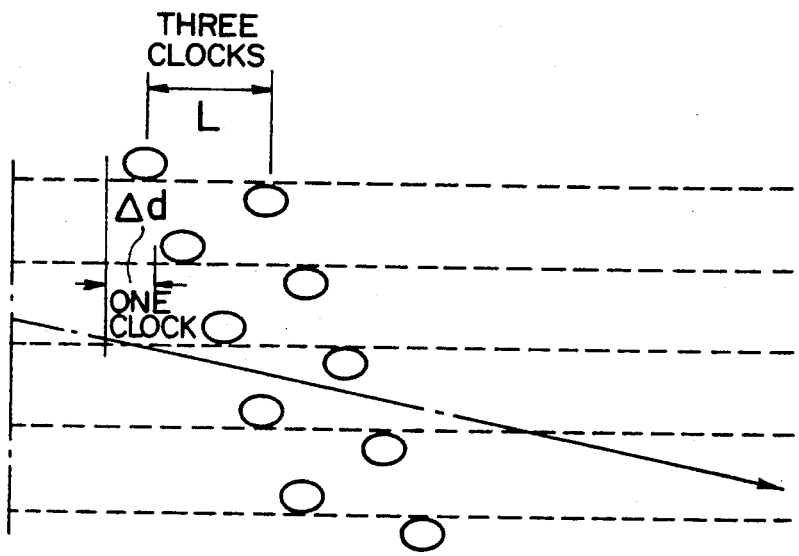
FIG. 2E
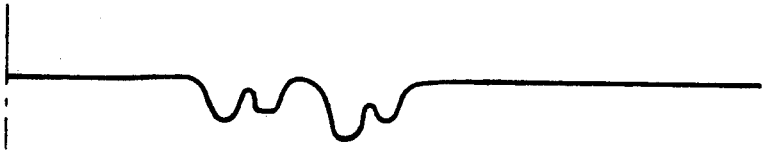
FIG. 2F  CK
FIG. 2G  PIT
FIG. 2H
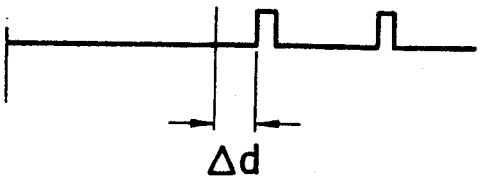

FIG. 6A
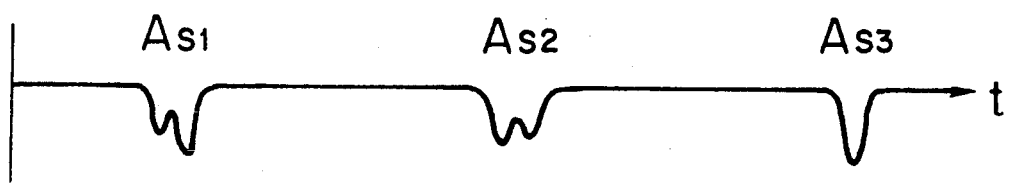
FIG. 6B
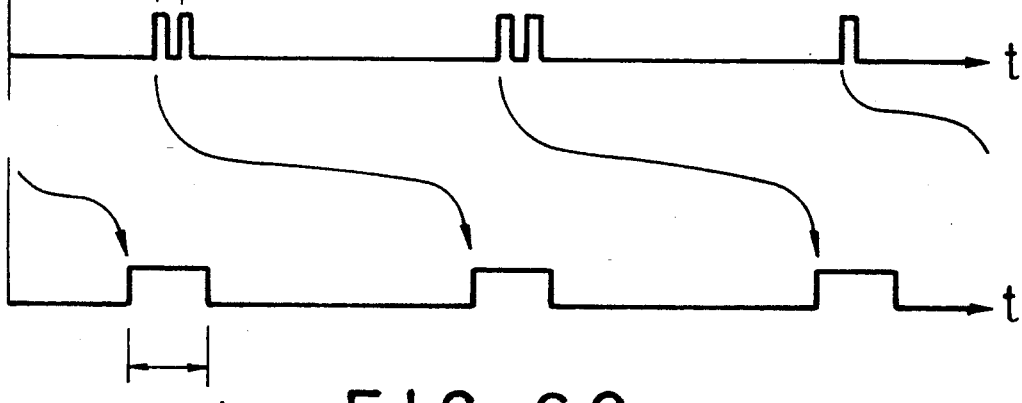
FIG. 6C

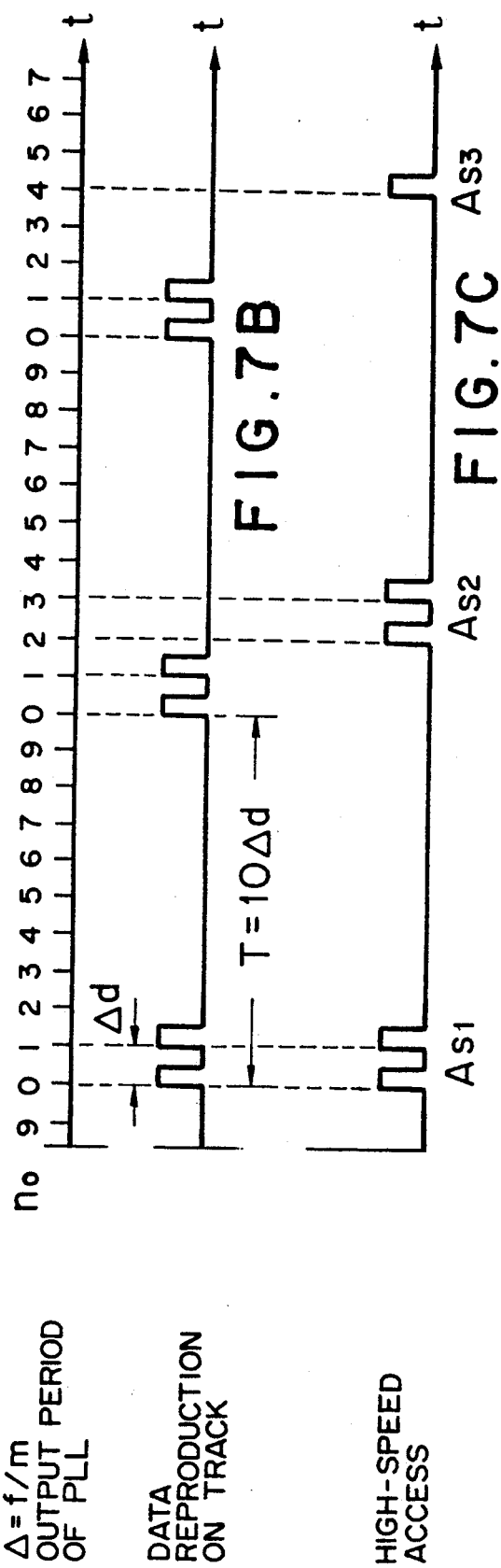

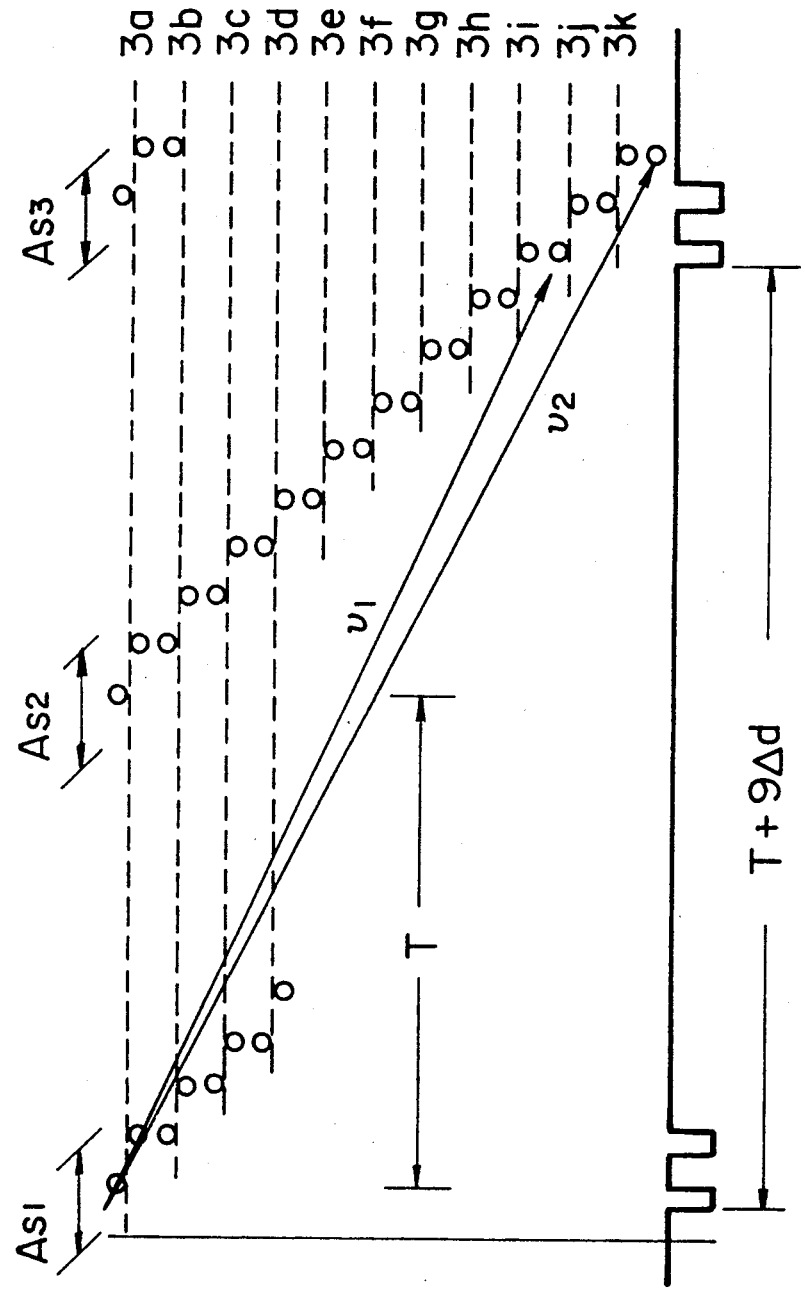

OPTICAL DISC HAVING A HIGH-SPEED ACCESS CAPABILITY AND READING APPARATUS THEREFOR

BACKGROUND OF THE INVENTION

The present invention relates generally to an optical disc in which servo areas each having recorded therein servo pits including at least clock synchronizing information are periodically disposed in each of tracks as well as an optical disc system for reading data or information from the optical disc. More particularly, the present invention is concerned with the optical disc and the optical disc reading or reproducing apparatus in which a high-speed access operation can be performed accurately by detecting the number of tracks traversed by a light spot.

Heretofore, various approaches or means for allowing the high-speed access operation in optical disc systems such as CD players, optical video disc systems or the like have been proposed. As one of such proposals, there is known a method which relies on the use of an external scale. According to this method, the position of an optical head is detected by means of the external scale, wherein the travel of the light spot projected from the optical head toward a desired destination track (i.e. the access operation) is controlled on the basis of the result of the detection. This method however suffers from many problems in that a high-precision external scale is required, correction is necessary for eccentricity of the tracks on the optical disc, rounding errors are likely to occur due to a rough scale pitch of the external scale and others. Thus, with this method, it is impossible to perform the access operation on a track-by-track basis. Under the circumstance, this method is employed solely for a rough access operation while a fine access operation as required is separately performed by resorting to another means. Thus, much time is involved in the access operation, giving rise to an additional problem.

On the other hand, there is known another method according to which the number of tracks on the optical disc traversed by the light spot is detected, wherein on the basis of the results of the detection, the position of the light spot as well as the speed at which the light spot is moved (hereinafter referred to as the moving speed of the light spot) is determined for allowing the light spot to be moved to a desired destination track (also referred to as the desired track) by controlling the moving speed of the light spot.

As one of the methods for detecting the number of the tracks traversed by the light spot, known is a method according to which guide grooves known as pre-grooves formed previously on the optical disc for the purpose of performing the tracking control of the light spot upon data reproduction or reading from the optical disc are made use of. (In this conjunction, reference may be made to, for example, a thesis entitled "High-Speed Access System for Optical Disc Memory" presented at the Optical Memory Symposium '86 held on Dec. 18, 1986.) More specifically, the optical disc is previously formed with pre-groove(s) in a helical or concentrical pattern, wherein a tracking control signal is derived from the pre-groove to be utilized for performing the tracking control of the light spot so that the light spot is moved along the pre-groove while allowing the data to be recorded or reproduced on or from the track by the light spot. This pre-groove is formed continuously so that each track is associated with the pre-groove.

Thus, whenever the light spot traverses the pre-groove, the associated track is necessarily traversed by the light spot. Accordingly, by detecting a change in amplitude of a signal outputted from a photodetector which change is brought about when the pre-groove is traversed by the light spot and by counting the occurrences of such change, it is possible to know the number of the tracks which has been traversed by the light spot.

On the other hand, there is another known example of the tracking control system a so-called sample servo system in which regions or areas are provided discontinuously or discretely on the optical disc for detecting the tracking control signal.

An exemplary structure of the optical disc in which the sample servo technique is adopted is illustrated in FIG. 1 of the accompanying drawings. As can be seen in this figure, servo areas $A_S$ are provided periodically at a predetermined distance or interval on each of tracks $3a$, $3b$, $3c$, $3d$, and so forth formed in the optical disc, wherein in each of the servo area $A_S$, a pair of servo pits $1a$ and $1b$ are recorded on the disc with an equal distance from the center line of the track (indicated by broken lines) in opposite directions therefrom while being concurrently deviated or offset from each other in the longitudinal direction of the track Now assuming that the optical disc of such structure is rotated in the direction indicated by an arrow X and that a light spot 4 is currently located on the track $3a$, then the servo pit $1a$ in the servo area $A_S$ is first detected by the light spot 4, being followed by detection of the servo pit $1b$. Thus, by comparing the amplitude of the signal resulting from the detection of the servo pit $1a$ with that originating in the servo pit $1b$, there can be derived or obtained a tracking control signal.

Parenthetically, the servo area $A_S$ has recorded therein a synchronizing pit for the purpose of clock synchronization. However, since the synchronizing pit is irrelevant to the essence of the subject matter of the invention, description thereof is omitted herein.

The sample-servo type optical disc of the structure described above is certainly advantageous in that the provision of a pre-groove which is required to have uniform width and depth with a high precision is rendered unnecessary, which in turn means that interference otherwise taking place between the control information reproduced from the pre-groove and the data information read from the track can no longer present any problem. However, there arises another problem in this known servo-sample type optical disc in conjunction with the high-speed access operation. More specifically, traversing of the tracks by the light spot 4 is detected in terms of detection of traversing of the servo areas $A_S$ on the track by the light spot 4. However, since the servo areas $A_S$ are discontinuously provided on the track with a data area being interposed between the adjacent servo areas, it may frequently occur that the light spot 4 traverses the track not exactly at the servo area but between the servo areas. In that case, it is impossible to detect the number of tracks traversed by the light spot without resorting to some other measures.

A method of making it possible to detect the number of tracks traversed by the light spot in the servo type optical disc is disclosed, for example, in "SPIE, Vol. 695: optical Mass Data Storage II" pp. 160–164. According to this known method, a gray code or the like representing a track address is recorded for each of the tracks. In this known system, there may sometimes occur a situation wherein the track portion where the above-mentioned code is not recorded is traversed by the light spot moved at a high speed in the radial direction in the course of high-speed access operation. However, once any one of the abovementioned codes is detected as the result of traversing of the track area having recorded therein that one code by the light spot, it is then possible to determine the position of the light spot on the basis of the code traversed by the light spot and the code recorded on the track from which the high-speed access operation is started.

SUMMARY OF THE INVENTION

In the case of the high-speed access operation for the optical disc previously formed with the pre-groove as described above, every track traversed by the light spot can be identified and discriminated from one another so long as no data are recorded on these tracks. However, when the data are recorded on the tracks and when the light spot traverses the tracks at the areas thereof where the data are recorded, the pre-groove in which the data is recorded and which thus undergoes deformation due to the data pits brings about distortion in the waveform of the detection signal produced upon traversing of the pre-groove by the light spot, which may eventually involve error in the signal detection and hence in the number of the tracks as detected. There is also known a method according to which the output signal resulting from the detection of the pre-groove is separated from the reproduced or read signal by using a filter or the like means by taking advantage of the fact that difference in the frequency exists between the data pit detection signal and the pre-groove detection signal. This method is certainly effective so far as the moving speed of the light spot is low, since then the frequency of the pre-groove detection output signal is sufficiently low when compared with that of the data pit detection output signal. However, when the moving speed of the light spot becomes high, the frequency difference between both the detection output signals is decreased to such an extent that separation of these detection output signals is no larger possible. As a concequence, a limitation is imposed on the moving speed of the light spot, giving rise to a problem that the access time can not significantly be reduced.

In contrast, in the case of the sample-servo type optical disc in which the access operation is realized by detecting the code, as described hereinbefore, it is certainly possible to reduce the access time (i.e. time taken for the access operation) by increasing the moving speed of the light spot. However, because of the necessity for recording the abovementioned code, the data recording area is correspondingly undesirably diminished. Thus, there arises a problem that the recording capacity of this optical disc is correspondingly reduced.

An exemplary system in which the code is additionally recorded for enabling the high-speed access operation in the so-called sample servo tracking system is disclosed, for example, in JP-A-62-143232 (Japanese Patent Application Laid-Open No. 143232/1987). According to this prior art technique, the radial position of the light spot is determined with the aid of patterns disposed on the optical disc in the radial direction and an associated radial direction memory.

Further, an example of the servo pit area is disclosed in JP-A-61-260426. In the case of this prior art system, servo blocks are arrayed in the radial direction, wherein the additional radial direction memory mentioned above is provided for the high-speed access operation.

Besides, there is disclosed in JP-A-58-108043 an optical disc in which the servo blocks on the adjacent tracks are disposed with deviation from each other such that the servo blocks as a while are arrayed in a helical pattern. In this case, an index signal is recorded in a helical pattern on the concentric tracks. In this known system, however, the moving speed of a sled is constant and no teachings are disclosed concerning the sled control method in the abovementioned publication. Besides, the index signal is of the same nature as the so-called address data and used only at the time of completion of the access operation.

In JP-A-Hl-263964 (Japanese Patent Application Laid-Open No. 263964/1990), a pit disposition similar to a wobble pit pattern is described. More specifically, a prepit pattern for the synchronization purpose is provided for every predetermined number of prepit pairs, wherein each prepit pattern is disposed along a radial line extending through the center of the pattern with the wobble pit pattern being also disposed in the same manner as the prepit pattern. In this publication, an example of the disposition of data areas with derivation or offset in phase relative to each other on a track-by-track basis is described. At any rate, the prepit patterns for synchronization must enable generation of the synchronizing signal of a constant phase independent of the radial positions of the prepit patterns Consequently, the synchronizing prepit pattern is necessarily divided by the radial line extending through the center thereof or includes the radial line passing the center thereof, which means that it is possible to provide the servo patterns in a helical array.

It is therefore an object of the present invention to solve the problems mentioned above and provide an optical disc as well as an apparatus for reading the optical disc in which the access operation is accomplished at a high speed with improved accuracy without need for any additional data.

In view of the above and other objects which will be apparent as description proceeds, there is provided according to a general aspect of the present invention an optical disc based on the sample servo concept in which servo areas disposed periodically on each of the tracks are offset or deviated in the direction lengthwise of the track between adjacent tracks.

According to another aspect of the invention, there is provided an optical disc system in which the optical disc mentioned above is utilized and which comprises means for detecting a servo signal originating in the servo pits from a detection signal output of a photodetector, means for generating a clock signal in synchronism with the servo signal, means for counting the clocks given by the clock signal to thereby output the count value at the timing of the servo signal, and means for generating a speed control signal for a light spot from the outputted count value.

BRIEF DESCRIPTION OF THE DRAWINGS

FIGS. 2D-2H depict a fragmentary plan view and associated waveforms showing another version of the optical disc shown in FIG. 2A;

FIGS. 6A-6C are a set of waveform diagram for illustrating operations of a photodetector, a binary digitizer circuit and a gate circuit shown in FIG. 3 in conjunction with the light spot move illustrated in FIG. 5;

FIGS. 7A-7C are a set of waveform for illustrating operation of a counter shown in FIG. 3;

FIG. 7D is a schematic block diagram for further processing the output of the counter;

FIG. 9 is a diagram for illustrating the marginal moving speed of the light spot similarly to FIGS. 8A and 8B.

DESCRIPTION OF THE PREFERRED EMBODIMENTS

In the following, the present invention will be described in more detail in conjunction with the preferred or exemplary embodiments thereof by reference to the accompanying drawings.

Figure 1:
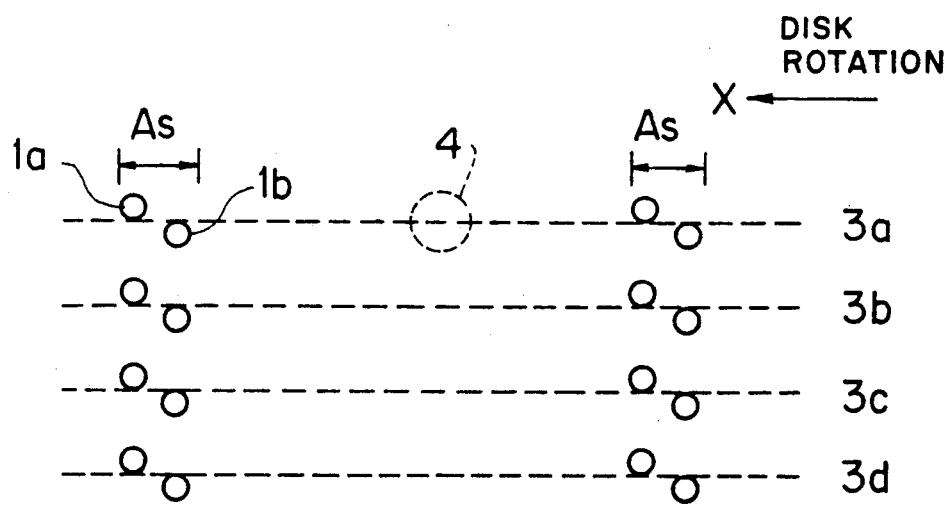
FIG. 1 is a fragmentary plan view showing a recording surface of a sample servo type optical disc known heretofore.
Figure 2A:
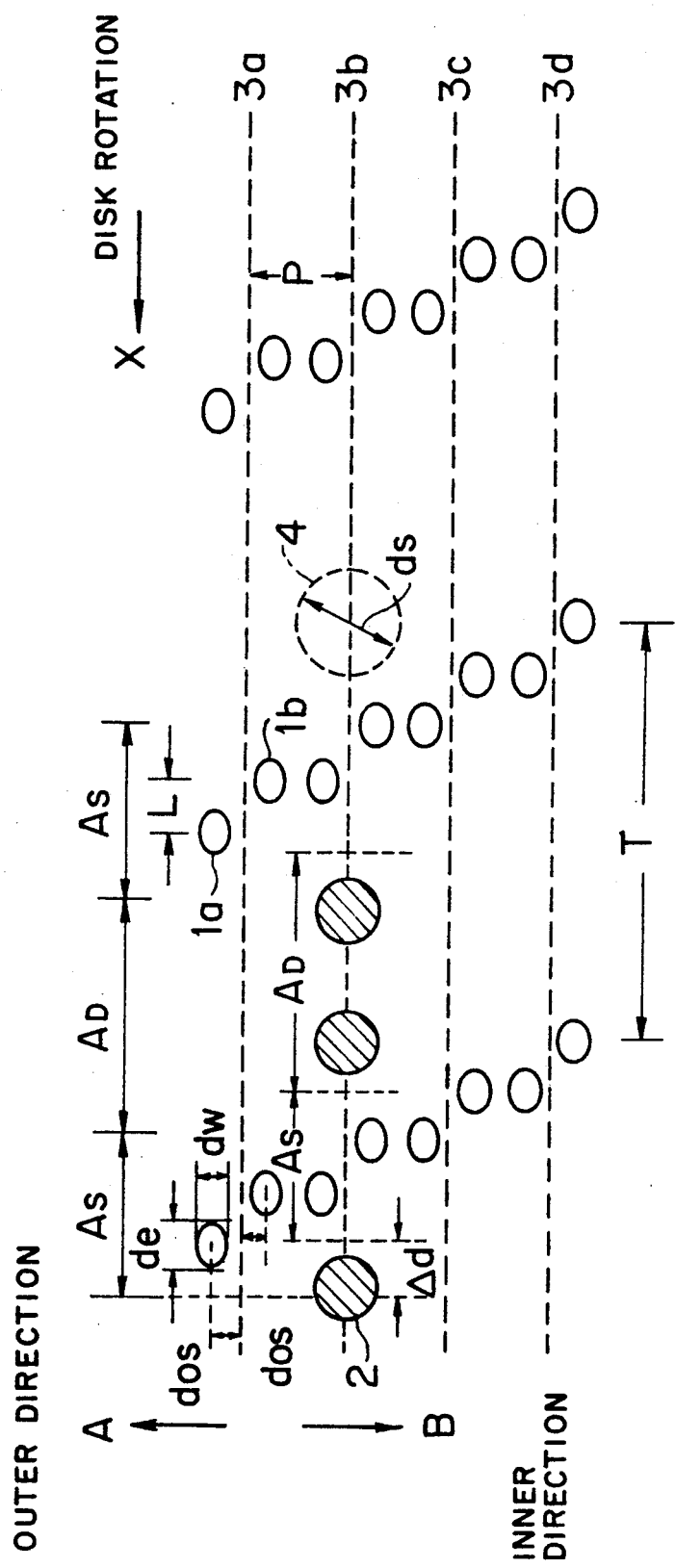
FIG. 2A is a fragmentary plan view showing a recording surface of an optical disc according to an exemplary embodiment of the present invention.

FIG. 2A is a fragmentary plan view showing schematically a structure of the optical disc according to an embodiment of the invention. In the figure, reference symbols $1a$ and $1b$ denote servo pits, numeral 2 denotes data pits, numerals $3a$, $3b$, $3c$ and $3d$ denote tracks, respectively, 4 denotes a light spot, $A_S$ designates servo areas and $A_D$ designates data areas.

As will be seen in FIG. 2a, each of the tracks $3a$ to $3d$ is provided with the servo areas $A_S$ periodically at an interval of a predetermined length T. On the other hand, each of the servo areas $A_S$ provided with a pair of servo pits which are, respectively, deviated or offset from the center line of the associated track indicated by a broken line by an equal distance $d_{OS}$ in the directions opposite to each other and additionally deviated or displaced from each other by a distance L, as viewed in the direction lengthwise of the track as well as in the pit reading direction. Relative to the servo area $A_S$ on adjacent tracks, the servo areas $A_S$ of the track located on the inner side is deviated by $\Delta d$ in the direction lengthwise of the track and in the pit reading direction. Besides, it will be seen that in all the tracks, the deviation $\Delta d$ of the servo area $A_S$ in any given one of the tracks is offset by $\Delta d$ in the pit reading direction relative to that of the immediately preceding adjacent track as viewed in the direction toward the innermost track.

More specifically, assuming that the optical disc is rotated in the direction indicated by an arrow X in FIG. $2a$ with the radially outermost track being located at the top of the figure, let's consider the tracks $3a$, $3b$ and $3c$, by way of example. It will then be seen that in the track $3a$ located radially outwardly relative to the track $3b$, the servo area $A_S$ thereof advances by $\Delta d$ in the rotational direction X of the disc while in the adjacent track $3c$ located radially inwardly relative to the track $3b$, the servo area $A_S$ thereof lags by $\Delta d$ in the rotational direction X of the disc.

The data area $A_D$ in which the data pits 2 are recorded extends between the servo areas $A_S$ in each of the tracks.

Upon detection (reproduction or reading) of the recorded or written data from the optical disc of the structure described above, the servo pits $1a$ and $1b$ formed in the servo area $A_S$ are made use of for the tracking control. When the high-speed access operation is to be performed by moving the optical head and thus the light spot 4 in the radial direction at a high speed, the servo pits $1a$ and $1b$ are utilized for detecting the number of the tracks which have been traversed by the light spot 4 during the access operation.

In the case of the illustrated embodiment, the shape of the servo pits and the relation between the offsets representing the deviations or displacements of the servo pits $1a$ and $1b$ in any given one of the servo areas $A_S$ from the center of the track in the opposite directions are equivalent to those of the pits used in the sample servo optical discs known heretofore. By way of example, when the spot diameter $d_s$ of the reading laser light spot 4 is given by $d_s \approx 1.6$ μm, then the track pits p may be $p \approx 1.6$ μm with the pit width $d_w$ being $d_w \approx 0.6$ μm. When the pit length $d_e$ is shortened at least approximately to 0.8 μm, this pit configuration is suited for peak detection based on the second order differentiation or the like and thus suited for deriving a clock synchronization signal from the wobble pits provided in the manner described above in conjunction with the illustrated embodiment of the invention.

On the other hand, formation of the pit with a greater pit length $d_e$ is advantageous in that sample and hold operation can be positively ensured upon deriving the tracking signal from the wobble pits. In that case, a clock pit $1c$ should preferably be added in such disposition as illustrated in FIG. 2B.

Figure 2B:
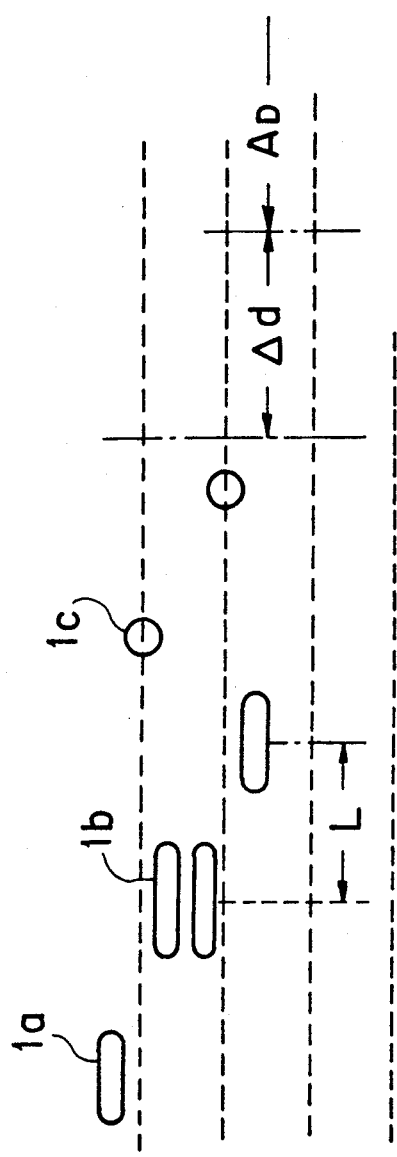
FIG. 2B is a fragmentary plan view showing a modification of the optical disc shown in FIG. 2A.
Figure 2C:
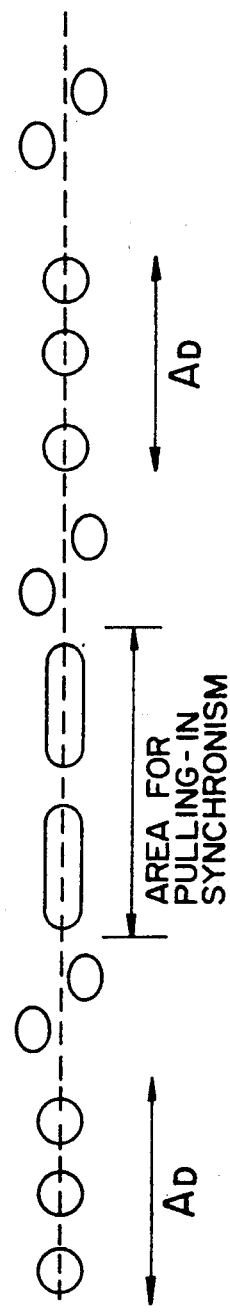
FIG. 2C is a fragmentary plan view showing an embodiment of the optical disc according to the invention in which a synchronization pull-in area is provided.

In case the paired wobble pits are included in each of the servo area block $A_S$ as shown in FIG. 2A or the clock pit $1c$ is included in addition to the wobble pits as shown in FIG. 2B, it is desirable to increase the inter-pit distance L of the wobble pits so that these pits can be definitely distinguished from each other.

On the other hand, the magnitude of the deviation $\Delta d$ between the servo areas $A_S$ on the adjacent tracks should correspond to a time duration mt which represents a product resulting from the multiplication of a clock duration t with an integer m, which will be described hereinafter. When the clock is to be utilized also as a data clock, the deviation $\Delta d$ should be selected on the order of 0.8 μm in the case of the example described above.

It should however be understood that the distance L between the servo pits may be selected equal to the length corresponding to three clocks with the deviation $\Delta d$ between the servo areas $A_S$ on the adjacent tracks being selected to be equivalent to one clock length, as illustrated in FIG. 2D.

Further, in case a synchronization pulling-in area containing elongated pits is provided at a position downstream of the servo area, as exemplified in FIG.

2C, discrimination of the data area from the servo area can be much facilitated.

The units or dimensions mentioned above for explaining the mutual relations among the various pits and the relation of the deviation (Δd) in the radial direction among the individual tracks are expressed in terms of the clock duration (i.e. in terms of the dimension of length) which is defined as the distance over which the optical head is moved relative to the disc thereabove during one clock on the assumption that the optical disc is rotationally driven at a constant angular velocity CAV, in order that the length of the record unit (i.e. the overall length of the servo area $A_S$ and the data recording area $A_D$) which differs from one to another track in the radial direction can be handled in a same manner. It goes without saying that the above expression can equally be applied to the CLV control which allows the optical head to trace the tracks on the disc at a constant linear speed regardless of whether the track is disposed at a radially inner or outer location.

Figure 3:
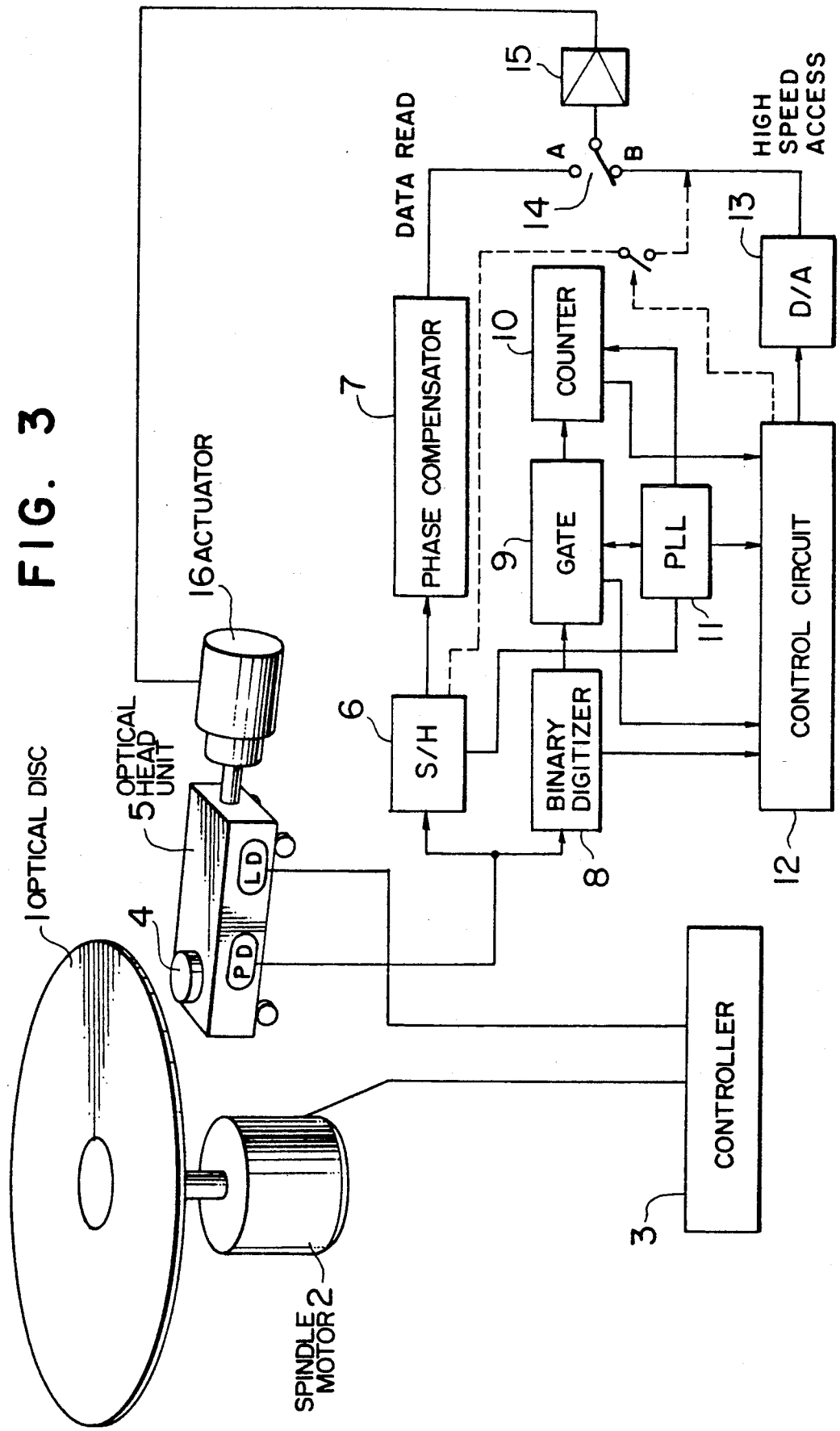
FIG. 3 is a block diagram showing a general arrangement of an apparatus for reading or reproducing the optical disc according to another embodiment of the invention.

FIG. 3 shows in a block diagram a general arrangement of a data reading or reproducing apparatus according to an embodiment of the invention for reading the data recorded on the optical disc of the structure described above. Referring to FIG. 3, a reference numeral 1 denotes the optical disc which is rotationally driven at a predetermined constant speed by a spindle motor 2 which in turn is controlled by a controller 3. The optical head 5 including a photodetector 4 is caused to make access to a track on the recording surface of the optical disc 1 at a desired high speed by means of a tracking actuator 16 which may be constituted by a voice coil motor or the like so as to perform the data reading operation along the track with the aid of the light beam spot (4 in FIG. 2A). On the other hand, the tracking actuator 16 is adapted to be operated in accordance with a control signal supplied from a signal processor which is also designed to perform data processing on the pit data read by the photodetector 4. To this end, the signal processing circuit is composed of a sample and hold (S/H) circuit 6, a phase compensator circuit 7, a binary digitizing circuit 8, a gate circuit 9, a counter 10, a phase-locked loop (PLL) circuit 11, a control circuit 12, a digital-to-analogue (D/A) converter circuit 13, a switch 14 and a power amplifier 15.

For reproduction or reading of the data from the optical disc 1, the switch 14 is closed to a contact or position A.

The optical disc 1 (FIG. 3) is rotated at a constant angular speed (CAV), wherein the reproduced signal picked up from the optical disc 1 through the photodetector 5 is supplied to the sample and hold (S/H) circuit 6 and additionally to the binary digitizing circuit 8. In the binary digitizing circuit 8, the reproduced signal is digitized into binary levels or values through differentiation and slicing with reference to an appropriate slice level. The resulting pulse signals representative of the individual pits on the optical disc are shaped The reproduced signal pulses thus produced are supplied to the control circuit 12 to undergo discrimination or identification of data pattern.

Further, the reproduced pulse signal outputted from the binary digitizing circuit 8 is supplied to the gate circuit 9 as well. This reproduced pulse signal contains a data signal originating in the data pits 2 of the data areas $A_D$ on the optical disc and a servo signal originating in the servo pits 1a and 1b recorded in the servo area $A_S$. Through the gate circuit 9, the servo signal is separated from the reproduced signal in response to a gate signal outputted from the phase-locked loop (PLL) circuit 11.

The phase-locked loop (PLL) circuit 11 generates a clock signal having a duration t. In this conjunction, it is to be noted that the deviation Δd of the servo area $A_S$ between the adjacent tracks and the deviation L between the servo pits 1a and 1b described hereinbefore by reference to FIG. 2A are so established as to be equal to an integral multiple tm of the clock duration t (where m represents a natural number) The servo signal resulting from the separation by the gate circuit 9 is supplied to the phase-locked loop (PLL) circuit 11, wherein the phase of the clock signal generated in the PLL circuit 11 is synchronized with the servo signal The gate signal mentioned above is derived from the clock signal. More specifically, the phase-locked loop (PLL) circuit 11 is initialized, as will be described hereinafter, to thereby generate the gate signal to serve for separation of the servo signal in the gate circuit while synchronizing the separated servo signal with the clock signal.

On the other hand, the sample and hold (S/H) circuit 6 is supplied with a sampling pulse signal from the phase-locked loop (PLL) circuit 11 at the timing at which the servo pits 1a, 1b are read for each of the servo areas $A_S$ shown in FIG. 2A. In the sample and hold (S/H) circuit 6, the signal amplitudes corresponding to the pits 1a and 1b, respectively, are sampled and held for each of the servo areas $A_S$, whereon the values as held are compared with each other for generating a tracking error signal. In the phase compensation circuit 7, the tracking error signal undergoes phase lead compensation or phase lead/lag compensation for stabilizing the tracking servo loop to be subsequently supplied to the tracking actuator 16 as the tracking control signal by way of the switch 14 and the power amplifier 15. In this manner, the tracking control can be performed such that the reproduced signals from the servo pits 1a and 1b have a same amplitude and thus the light spot 4 can scan the individual track without offset therefrom.

In order to make access at a high speed to a destination track designated by an externally input signal (i.e. upon high-speed access operation), the switch 14 is changed over to the position B.

The optical head is moved at a high speed in the radial direction of the optical disc until the designated track (hereinafter also referred to as the destination or desired track) has been attained. To this end, a speed v* at which the optical head and hence the light spot is to be moved (hereinafter referred to as the desired moving speed) is set by the control circuit 12. In this conjunction, by setting the desired move speed v* so as to be proportional to the square root of the number of tracks remaining to be traversed before reaching the desired track, there can be realized such seek characteristic that the desired moving speed v* is highest at the start of the high-speed access operation and tends to be lowered as the light spot approaches to the desired track, whereby the time taken for the track seek (i.e. the time taken for the light spot to move to the desired track) can advantageously be reduced.

Figure 4:
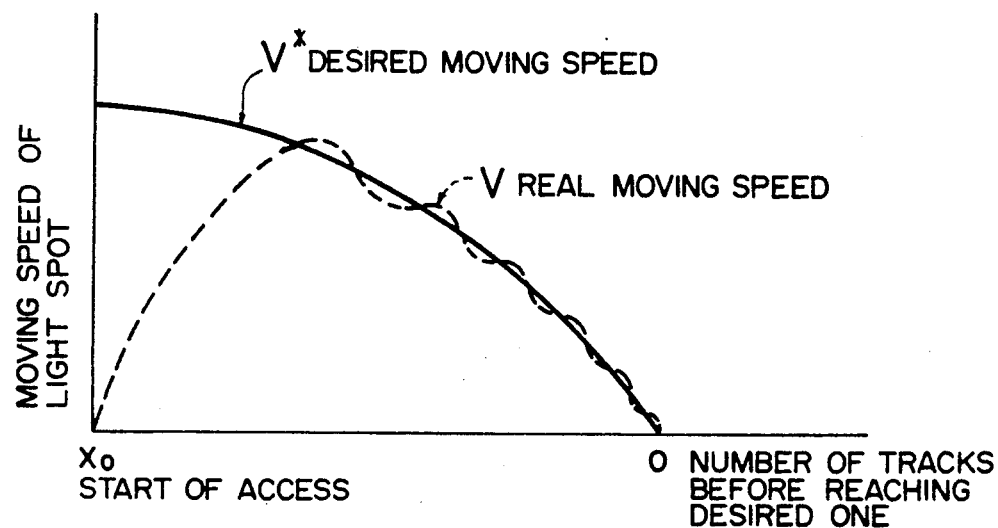
FIG. 4 is a view for graphically illustrating, by way of example, moving speed of a light spot in the course of high-speed access operation.

An example of the desired moving speed (v*) characteristic is graphically illustrated in FIG. 4 in the form of a solid-like curve. In this figure, the number of the tracks remaining to be traversed before reaching the desired track is taken along the abscissa, wherein $X_O$ represents the total number of the tracks to be traversed by the light spot starting from the track where the high-speed access operation is to be started (hereinafter, this track is referred to as the start track) to the desired track. The track number $X_O$ is set at the control circuit 12 upon start of the high-speed access operation.

In the optical disc shown in FIG. 2A, the periodical interval length T between the servo areas $A_S$ is so determined as to be equivalent to the deviation $\Delta d$ between the servo areas $A_S$ on the adjacent tracks multiplied with n (where n represents a natural number). Accordingly, since $\Delta d = nt$ where t represents the duration of the clock, as described hereinbefore, $$T = n\Delta d = mnt \tag{1}$$

In other words, the periodic interval length T between the servo areas $A_S$ is equivalent to an integral multiple of the clock duration t. The tracks on the optical disc may be formed either concentrically or helically. In the case of the tracks formed concentrically, the clock duration t and the periodical interval length T between the servo area $A_S$, respectively, may be selected to be equal to the rotation period of the optical disc divided by integers, respectively, with the positions of the servo areas $A_S$ being deviated by $\Delta d$ from one to another track in the sequence in which the tracks are arrayed. On the other hand, in the case of the helical track disc, the abovementioned dimensions may be determined in accordance with one of two methods mentioned below.

(1) The clock duration t and the periodical interval length T between the adjacent servo areas $A_S$ are selected to be equivalent to one rotation period (relative tracing length of the optical head during one rotation) divided by integers, respectively, with the periodical interval length T between the servo areas $A_S$ being increased or decreased by $\Delta d$ for every rotation of the optical disc.

(2) The rotation period of the optical disc is so adjusted as to be an integral multiple of the clock duration t and longer or shorter by $\Delta d$ than an integral multiple of the periodical interval length T between the servo areas $A_S$.

The first mentioned method (1) is not preferred because deviation or pull-out in the synchronization takes place at the location where the periodical interval length T between the servo area $A_S$ is increased or decreased, leading to occurrence of offset in the timing for detection of the servo pits. In contrast, when the adjustment (2) mentioned above is adopted, the periodical interval length T between the servo areas $A_S$ always remains invariable even when the reproduction is performed continuously over several tracks to thereby ensure stable operation of the sample and hold (S/H) circuit 6 and the gate circuit 9. In conjunction with the second mentioned method (2), the rotation period $T_R$ of the optical disc is given by $$T_R = kT \pm \Delta d = (kn \pm 1)\Delta d \tag{2}$$

where k represents a natural number and wherein $n \approx 20$, $m \approx 1$ and $k \approx 3,000$ in general.

Turning back to FIG. 3, once the desired track as well as the number $X_O$ of tracks to be traversed by the light spot before reaching the desired track (FIG. 4) has been set in the control circuit 12, a control signal which accords with the track number $X_O$ is outputted from the control circuit 12 to be subsequently converted to an analogue signal by the D/A converter 13, which analogue signal is then supplied to the tracking actuator 16 as the speed control signal. In response to this signal, the light spot 4 (FIG. 2A) starts the high-speed access operation in the radial direction of the optical disc.

Thus, similarly to the case of data reproducing operation mentioned hereinbefore, the reproduced signal produced by the photodetector 4 is digitized into binary levels by the binary digitizing circuit 8 to be supplied to the gate circuit 9 where the servo signal is separated. Assuming that the phase-locked loop (PLL) circuit 11 is initialized, as will be described hereinafter, the PLL circuit 11 is locked to the servo signal outputted from the gate circuit 9 even during the high-speed access operation, because the optical disc is rotated at a constant angular velocity and because the rotation period of the optical disc is an integral multiple of the clock duration.

At the instant the light spot 4 traverses the servo area $A_S$ (FIG. 2A), the photodetector 5 outputs the servo signal. Accordingly, by supplying the gate signal to the gate circuit 9 from the PLL circuit 11 at the time point when the servo area $A_S$ is traversed, it is possible to separate the servo signal by the gate circuit 9.

In the case of the data reading or reproducing operation, the scanning or tracing path of the light spot 4 coincides with the track. On the other hand, in the case of the high-speed access operation, the path along which the light spot 4 is moved is inclined relative to the tracks, wherein angle of the inclination is increased as the moving speed of the light spot 4 becomes higher. Further, because the servo areas $A_S$ are mutually deviated by $\Delta d$ between the adjacent tracks (FIG. 2A), the periodical length T (FIG. 2A) of the servo signal detected upon data reading operation is changed to T' in the case of the high-speed access operation which is given by the undermentioned expression (3):

$$T' = T \pm l\Delta d \tag{3}$$

where l represents a natural number which assumes a greater value as the moving speed of the light spot becomes higher with the angle of inclination of the light spot moving path relative to the track being correspondingly increased. In conjunction with the sign "$\pm$" appearing in the above expression (3), it should be noted that the plus sign "+" applies valid when the light spot is moved in the high-speed access operation toward the adjacent track where the servo area $A_S$ lags in phase (i.e. in the direction indicated by the arrow B in FIG. 2A) while the minus sign "−" applies valid upon high-speed access operation in the direction toward the adjacent track where the servo area $A_S$ leads or advances in phase.

In the gate circuit 9, the period T' given by the expression (3) is predicted for separation of the servo signal from the reproduced signal through the gating operation, which will be described below by reference to FIGS. 5 and 6A-6C.

Figure 5:
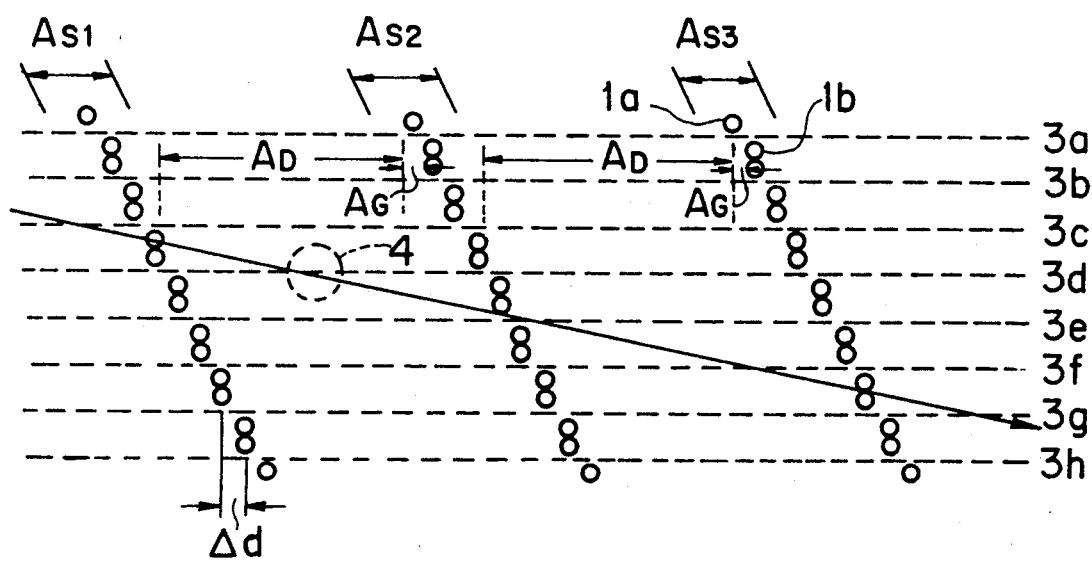
FIG. 5 is a diagram for illustrating, by way of example, how the light spot is moved on the optical disc shown in FIG. 2A upon high-speed access operation.

Now, referring to FIG. 5, it is assumed that the high-speed access operation is taking place with the light spot 4 traversing the tracks 3a, 3b and so forth with an inclination relative thereto, as indicated by a solid line arrow. When band-like regions containing the servo areas mutually deviated by $\Delta d$ between the adjacent tracks and extending across the individual tracks with an inclination are represented b $A_{S1}$, $A_{S2}$, $A_{S3}$ and so forth, as is clearly shown in FIG. 5, it can be seen that the light spot 4 traverse the band-like servo area $A_{S1}$ substantially at the time when the spot 4 traverses the track 3c, and subsequently traverses the servo area band $A_{S2}$ upon traversing the track 3e, while the servo area band $A_{S3}$ is traversed substantially at a mid point between the tracks 3f and 3g.

Under the circumstances, the reproduced signal outputted from the photodetector 5 assumes such a waveform as shown in FIG. 6A when the light spot 4 traverses the servo area bands $A_{S1}$, $A_{S2}$ and $A_{S3}$. As can be seen from this waveform diagram, two waves or peaks make appearance upon traversing of the servo area band $A_{S1}$ by the light spot 4 due to the servo spots 1a and 1b on the track 3d. For the same reason, two waves make appearance when the light spot 4 traverses the servo area band $A_{S2}$. However, when the light spot traverses the servo area band $A_{S3}$, both the servo pit 1b on the track 3f and the servo pit 1a on the track 3g are scanned simultaneously, resulting in that only a single wave makes appearance, as indicated by $A_{S3}$ in FIG. 6A.

When the reproduced signal of the waveform mentioned above is digitized into two levels by the binary digitizing circuit 8 (see FIG. 3), a servo signal containing two pulses at a time interval $\Delta d$ is obtained when the servo area band $A_{S1}$ is traversed by the light spot 4, as shown in FIG. 6B. Similarly, a servo signal consisting of two pulses is obtained upon traversing of the servo area band $A_{S2}$ by the light spot 4 as well. On the other hand, traversing of the servo area band $A_{S3}$ by the light spot 4 results in a servo signal consisting of a single pulse.

The gate circuit 9 serves for the function to predict on the basis of the servo signal produced upon traversing of the servo area band the timing at which the succeeding servo area band will be traversed, to thereby generate the gate signal for separating the servo signal produced at the succeeding servo area band.

The gate signal mentioned above is illustrated in FIG. 6C. As can be seen from this waveform diagram, the gate signal for the servo signal originating in the servo area band $A_{S1}$ shown in FIG. 6B is generated on the basis of the servo signal detected from the immediately preceding servo area band $A_{S2}$, while the gate signal for the servo signal originating in the servo area band $A_{S2}$ is derived from the servo signal originating in the servo area band $A_{S1}$.

Even when the light spot is moved at a high speed, the period T' of the servo signal given by the aforementioned expression (3) remains constant. Accordingly, by detecting this period T' and matching the period of the gate signal with the period T', it is possible to separate the servo signal without fail. Of course, when the move of the light spot 4 is accelerated or decelerated, the parameter l appearing in the expression (3) is correspondingly varied to thereby change the period T' of the servo signal. In such case, the number k of rotation or the angular speed of the optical disc may be increased in correspondence to the acceleration, for example, to thereby shorten the period T correspondingly. In this way, there can be suppressed any remarkable difference between the number of the tracks traversed by the light spot when it moves from a given servo area band including a radial series of servo areas to an immediately succeeding servo area band and the number of tracks traversed by the light spot moving from the succeeding servo area band to the next succeeding servo area band.

However, the timing at which the gate signal is generated is set by taking into account the abovementioned difference in the number of tracks. Let's assume that the high-speed access operation is to be performed, as described hereinbefore by reference to FIG. 5. In that case, the sign "+" appearing in the expression (3) is selected. Then, the period T' of the servo signal T' becomes longer than the period T. Accordingly, with reference to the detected servo signal, the gate signal is generated with a delay of $\Delta d$ relative to the duration T' of the servo signal detected until then.

Identification of the high-speed operation can be achieved by making longer the length of gap $A_G$ existing between the trailing end of the data area $A_D$ and the servo pit pair of the succeeding track than the deviation $\Delta d$, as shown in FIG. 5. Assuming now that the servo signal originating in the servo area $A_{S1}$ is separated by the gate circuit 9 and that the period length or duration T' of this servo signal and that separated immediately before is increased when compared with the duration of the servo signals separated in precedence to the abovementioned signals, then the gate signal for separating the servo signal generated at the succeeding servo area band $A_{S2}$ is produced with a further delay of $(T'+\Delta d)$ than the servo signal originating in the servo area band $A_{S1}$.

On the other hand, when the light spot 4 is to be decelerated, the duration T' of the servo signal is reduced. Accordingly, the timing for generation of the gate signal is initially so set as to be delayed by $(T'-\Delta d)$ relative to the detected servo signal.

Parenthetically, starting of the high-speed access operation, the gate signal is set in respect to the phase and period thereof so as to be capable of separating the servo signal at the start track through initialization described later on.

Once the high-speed access operation is started, the timing for the gate signal is set at each of the radial servo area bands $A_{S1}$, $A_{S2}$ and so forth each including radially consecutive servo areas, as described above. The pulse width of the gate signal is set not longer than $3\Delta d$. By providing the blank periods $\Delta d$ in precedence to the preceding servo pit 1a and in succession to the succeeding servo pit 1b, respectively, in each of the servo area, it is possible to extract at least the pulse originating in the servo pit 1a by the gate signal in each of the servo area bands.

Turning back to FIG. 3, the servo signal separated by the gate circuit 9 in the manner described above is supplied to the counter 10 initialized in accordance with the period length or duration T (=10 t). In the phase-locked loop (PLL) circuit 11, the clock frequency f is divided by m, whereby the pulses each having a period $\Delta d$ are generated to be supplied to the counter 10 for the counting thereof. The counter 10 supplies the count value to the control circuit 12 at the timing of the servo signal pulse originating in the servo pit 1a supplied from the gate circuit 9. On the basis of this count value, the number of the tracks traversed by the light spot 4 is calculated for determining arithmetically the real moving speed Y of the light spot 4, as described below in detail.

The counter 10 is reset by means (not shown) upon every complete rotation of the optical disc. Since the periodical interval T between the servo areas (FIG. 2A) on the optical disc is $n\Delta d$, as can be seen from the expression (1), carry of the counter 10 takes place at least every n counts (in the case of the illustrated embodiment, the carry takes place every tenth count).

Thus, when the counter 10 is reset at the time point the servo signal is supplied from the gate circuit 9 at the start track, the counter 10 is reset upon every complete rotation of the optical disc starting from the reset time point mentioned above. In the case of the data reproducing or reading operation, the count value of the counter 10 assumes n, 2n, 3n and so forth at the time points the servo signal is outputted from the gate circuit 9 during each rotation of the optical disc, wherein the least significant digit value $n_0$ is "0".

In contrast, in the case of the high-speed access operation, the periodical interval length T' between the servo areas differs from that in the data reproduction as a function of the moving speed of the light spot in accordance with the expression (3). Accordingly, assuming that the light spot 4 has traversed l tracks before reaching a given servo area, the value $n_0$ at the least significant digit of the count value in the counter at the time point the servo signal originating in the servo pit 1a of said given servo area assumes (n−l) in case the light spot 4 is moved toward the adjacent track having the leading servo area (i.e. in the direction indicated by the arrow A in FIG. 2A), while the value $n_0$ assumes (+l) when the light spot is moved in the opposite direction (indicated by the arrow B in FIG. 2A or the arrow in FIG. 5). Thus, in the former case, the number of the tracks to be traversed by the light spot 4 between the successive servo areas can be determined by subtracting the value $n_0$ of the least significant digit or position of the counter 10 from the value n, while in the second mentioned case, the number of the tracks to be traversed by the light spot between the servo areas can be determined straightforwardly from the value $n_0$ of the least significant digit. Thus, the number of the tracks actually traversed by the light spot 4 in the course of the moving between given adjacent servo area bands can be obtained by subtracting from the number of tracks determined in the manner mentioned above the number of the tracks obtained when the servo area band preceding by one was traversed. Further, the number of tracks remaining to be traversed before reaching the desired track can be calculated on the basis of the track number obtained from the counter 10, while the corresponding desired moving speed v* can be determined from the remaining track number.

Now, let's represent the pitch of the track by P and the number of tracks traversed by the light spot 4 between the servo areas by l. Since the time taken for the light spot 4 to traverse the abovementioned number of tracks is given by the expression (3), the real moving speed v of the light spot 4 between the servo areas in the direction indicated by the arrow A in FIG. 2A is given by $$V_- = \frac{lP}{T - l\Delta d} = \frac{P}{\Delta d} \cdot \frac{l}{n - l} \quad (4)$$

while the real moving speed in the direction indicated by the arrow B in FIG. 2A is given by $$V_+ = \frac{lP}{T + l\Delta d} = \frac{P}{\Delta d} \cdot \frac{l}{n + l} \quad (5)$$

The real moving speed $v_-$ or $v_+$ is then compared with the desired moving speed v* determined through the procedure mentioned above, wherein the resulting difference is outputted from the control circuit 12 to be subsequently converted into an analogue signal by the D/A converter 13, the analogue signal thus derived being then supplied to the tracking actuator 16 as the speed control signal by way of the switch 14 and the power amplifier 15. In this way, the light spot is moved under such control that the real moving speed $v_-$ or $v_+$ follows the desired moving speed v*, as indicated by broken line curves in FIG. 4.

Now, description will be made of detection of the count value of the counter 10 on the assumption that the high-speed access operation is performed starting from the track 3c in the direction indicated by the arrow in FIG. 5.

Referring to FIG. 7A-7C, there are illustrated the pulses supplied to the counter 10 from the phase-locked loop (PLL) circuit 11 (FIG. 3) and each having a period of Δd together with the values $n_0$ at the least significant digit or position of the counter 10 adapted for counting the abovementioned pulses.

During the data reproducing or reading operation with the light spot 4 on the track 3c, the value $n_0$ at the least significant digit or position of the counter 10 assumes "0" and "1" in response to detection of the servo pits 1a and 1b, respectively, in each of the servo areas $A_{S1}$, $A_{S2}$ or $A_{S3}$ with reference to the timing shown in FIG. 7A, as can be seen from FIG. 7B.

Let's suppose now that the high-speed access operation is started at a time point when the light spot 4 is positioned in the vicinity of the servo area $A_{S1}$ on the track 3c, as illustrated in FIG. 5. In that case, when the servo pit 1a of the servo area $A_{S2}$ can be detected upon traversing thereof by the light spot 4, the count value of the counter 10 is "12" with the value $n_0$ at the least significant digit being "2", as shown in FIG. 7C. Since the light spot 4 is moved in the direction indicated by the arrow B in FIG. 2A, the value "2" represents the number of the tracks traversed by the light spot in the course of its move between the servo areas $A_{S1}$ and $A_{S2}$, i.e. the number of the tracks traversed by the light spot 4 from the time point the high-speed access operation was started.

When the servo pit 1a of the servo $A_{S3}$ detected upon traversing thereof by the light spot 4, the value $n_0$ at the least significant digit of the counter 10 is "4", as shown in FIG. 7C. This means that the number of the tracks traversed by the light spot 4 since the start of the high-speed access operation is "4" on the assumption that the counter 10 counts up with the period of T=10n between the servo areas.

As will be appreciated from the above description, when the counter 10 is initialized at the start track (FIG. 7A, (b)), as mentioned above, the value $n_0$ at the least significant digit of the counter 10 obtained every time the servo pit 1a is detected represents the number of the tracks which have been traversed by the light spot 4 in the course of the high-speed access operation.

In this way, the number of tracks traversed by the light spot during the high-speed access operation can be obtained every time the servo signal is detected, whereby the desired moving speed v* and the real moving speed v can be determined through the procedure described hereinbefore.

In conjunction with the counter operation described above, only by way of example, it will be noted that the value $n_0$ at the least significant digit of the counter 10 becomes minimum every time the light spot 4 has traversed ten tracks. In that case, the number of tracks traversed by the light spot 4 can be obtained by adding "10" to the value $n_0$.

By way of example, referring to FIG. 9, when the high-speed access operation is performed at a speed $V_1$ which can be expressed in terms of a vector sum of the linear speed of the optical disc and the seek speed of the light spot, the period intervening between the pit 1a of the servo area $A_{S1}$ and the pit 1a in the servo area $A_{S2}$ is given by $(T+9\Delta d)$, while at a speed $V_2$, the period of concern is $(T+11\Delta d)$. However, since the counter 10 is a decimal counter, the value $n_0$ at the least significant is equal to "1". In that case, the real moving speed Y for the case where $l=11$ can be arithmetically determined by resorting to extrapolation in the control circuit 12.

As will now be appreciated from the foregoing description, the light spot 4 is so controlled that the real moving speed thereof follows the desired moving speed $v^*$, as illustrated in FIG. 4. In the case of the illustrated embodiment, the desired moving speed $v^*$ is so established as to be proportional to the square roots of the number of tracks remaining to be traversed by the light spot before reaching the desired track. However, the present invention is never limited to such desired moving speed $v^*$. By way of example, the desired moving speed $v^*$ established as mentioned above may be decelerated more gently in the vicinity of the desired track. In any case, information about a function or the like prescribing the desired moving speed $v^*$ is stored in a memory incorporated in the control circuit 12.

It should further be mentioned that the real moving speed of the light spot 4 can be obtained by other method than those relying on the expressions (4) and (5). For example, taking into consideration the fact that the successive positions of the light spot can be detected on the basis of the count values of the counter 10 as described hereinbefore, it is equally possible to determine the real moving speed of the light spot 4 by setting a reference time in the control circuit 12 and differentiating the position signal derived from the change in the position of the light spot 4 on the basis of the preset reference time.

For example, with such a block structure as shown in FIG. 7B, it is possible to determine the number of the tracks traversed by the light spot in the course of the seek operation from the start track to the current one by integrating the deviations ±1. Once the counter is reset at the start track, the current position of the light spot can be obtained straightforwardly from the count value in the counter. By differentiating the count value, the real moving speed of the light spot can be derived.

Referring to FIG. 3, by modifying the circuit arrangement as indicated by broken lines to thereby add a tracking error signal produced from the sample and hold (S/H) circuit 6 (at the first time) to the position signal, the low-speed seek operation can be stabilized in the vicinity of the desired track where the tracking control becomes effective, whereby the light spot 4 can be smoothly led onto the desired track in the tracking state.

In this conjunction, it is possible to estimate the limit or marginal real or actual moving speed of the light spot 4 which allow the number of the tracks traversed to be determined on the basis of the real moving speed $v_-$ or $v_+$ given by the expression (4) or (5), respectively.

More specifically, referring to FIG. 2A, when the light spot 4 is to be moved such that the servo areas of the adjacent tracks are relatively deviated successively in the rotational direction X of the optical disc, as indicated by the arrow A, the light spot 4 has to be so moved as to traverse necessarily the succeeding servo area.

In the magneto-optical disc where the data pits are magnetic domains and the servo pits are optical pits, separation of the servo signal is not needed.

Figure 8A:
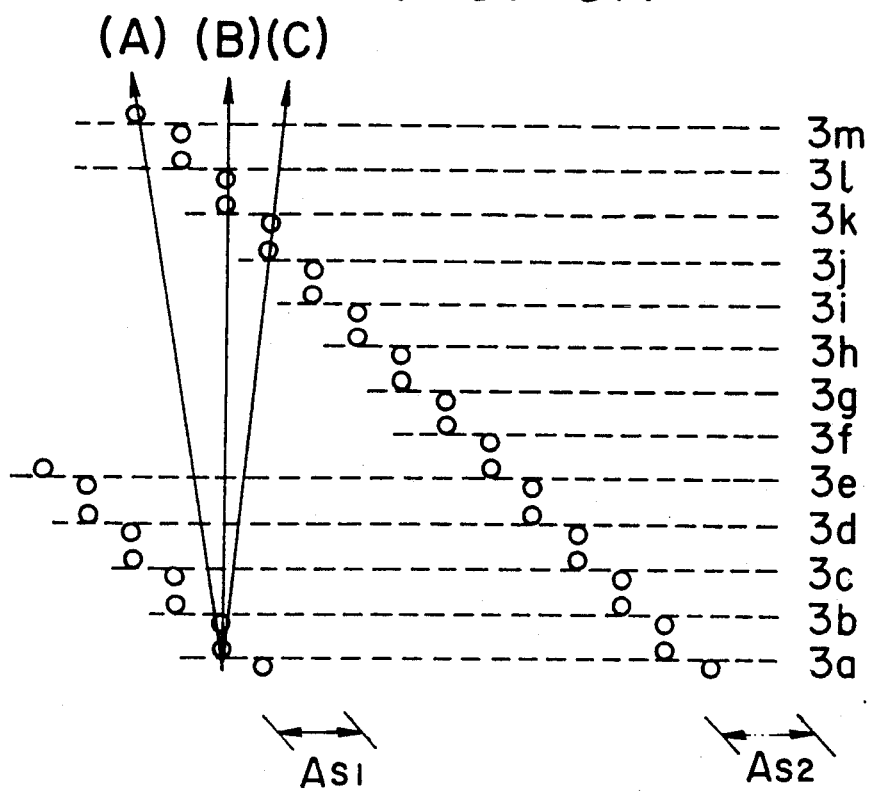
FIGS. 8A and 8B are diagrams for illustrating marginal moving speed of the light spot for the detection of the number of tracks traversed by the light spot.

Referring to FIG. 8A, let's consider the movement of the light spot 4 on the assumption that n is equal to "10". As can be seen in this figure, when the light spot is moved with n=10 from the track 3a set as the reference track, the tenth track 3m counted from the reference track 3a has the servo areas same as those of the latter. Accordingly, when the light spot is moved in the direction indicated by the arrow B and traverses the succeeding servo area $A_{S2}$ at the track $3_m$, the count value contained in the counter 10 (FIG. 3 at that time point is equal to the count value at the time point the light spot traversed the servo area $A_{S1}$ on the reference track 3a). Consequently, the count value of the counter 10 will then be same as the count value obtained where the light spot moves along one and the same track notwithstanding of the fact that the light spot has traversed the tracks, rendering it impossible to detect the number of the tracks actually traversed by the light spot.

However, in the regions of the tracks 3a, 3m and so forth where the servo areas overlap one another, they are arrayed substantially in the radial direction, making it impossible for the optical head moving substantially in the radial direction relative to the rotating optical disc to move the light spot in the manner mentioned above, needless to say of the impossibility of the light spot to move in the direction indicated by the arrow A.

Figure 8B:
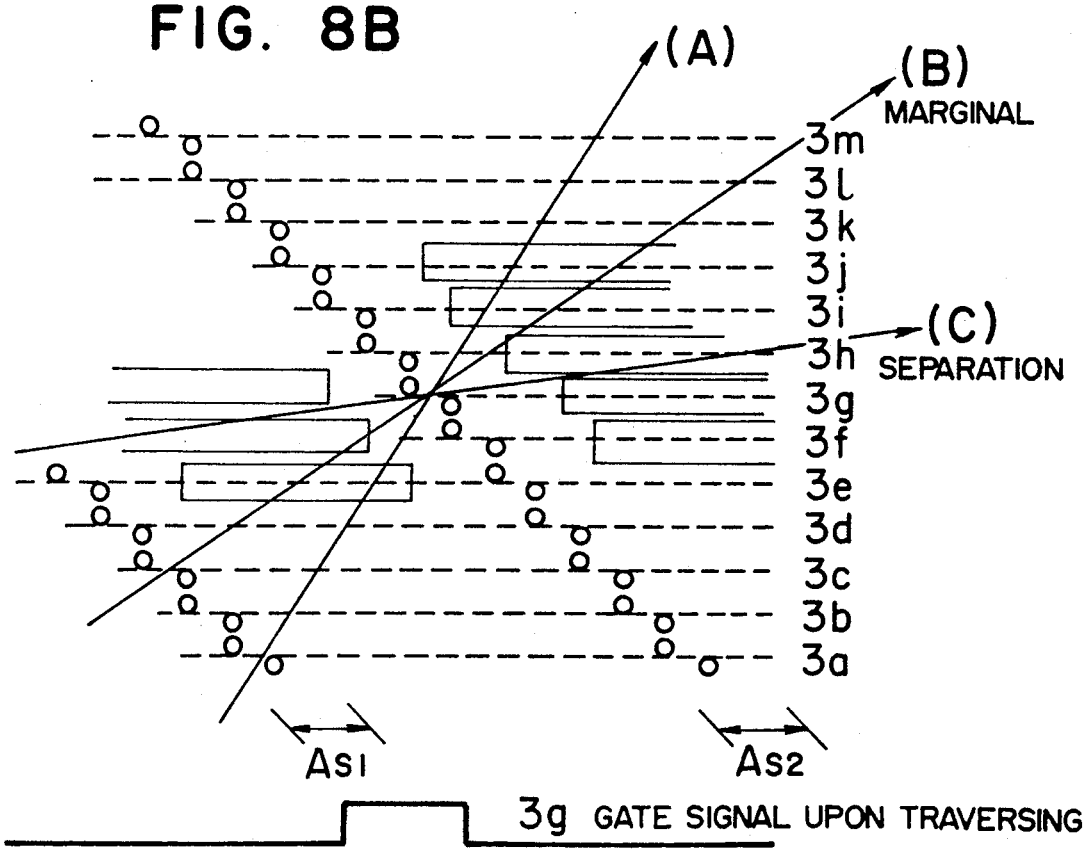

Accordingly, the marginal moving direction of the light spot relative to the optical disc which allows not only the light spot to be moved notwithstanding of physical limitation imposed on the optical head but also the number of tracks traversed by the light spot to be detected will be the direction indicated by the arrow (c) in FIG. 8B, i.e. the direction towards the servo area $A_{S2}$ on the track 3l which is deviated from the servo area $A_{S1}$ on the reference track 3a. In other words, assuming that the periodical interval length T between the servo areas is given by $n\Delta d$ with n representing the number of tracks traversed by the light spot 4 between the adjacent servo areas as viewed in the moving direction of the spot, it is possible to detect the number of the tracks traversed by the light spot when the following condition is satisfied:

$$n - l \geq 1 \qquad (6)$$

Thus, by determining l from the expression (4) and substituting it in the expression (6), the marginal moving speed $v_-$ of the light spot is given by the following expression:

$$v_- \leq \frac{P}{\Delta d}(n-1) \qquad (7)$$

Assuming, for example, that $P=1.6$ μm, $\Delta d=0.6$ μsec and $n=20$, then $v_- \leq 50$ m/sec., which is a value sufficient for practical application.

Next, description will be made for the case in which the light spot is moved to the adjacent track having the lagging servo areas thereon, as indicated by the arrow B in FIG. 2A.

Referring to FIG. 9 and assuming that $n=10$, as in the case of the example illustrated in FIG. 8A, with the track 3a serving as the reference track, it can be seen that the servo area on the tenth track 3K as counted from the reference track 3a is in phase with the servo area on that reference track 3a. Consequently, the marginal moving speed of the light spot which allows the tracks to be detected is such that the light spot traversed the servo area band $A_{S1}$ on the reference track 3a traverses the ninth track 3j as counted from the reference track 3a in the succeeding servo area $A_{S2}$, as indicated by the solid line arrow $V_1$. In general, in order that the number of the tracks can be detected, the following condition has to be satisfied:

$$n + 1 \leq 2n - 1 \qquad (8)$$

By determining 1 from the aforementioned expression (5) and placing it in the expression (8), then $$v_+ \leq \frac{P}{\Delta d} \cdot \frac{n-1}{2n-1} \qquad (9)$$

Thus, assuming that $P = 1.6 \mu m$, $\Delta d = 0.6 \mu m$ and $n = 20$, then $v_+ \leq 1.3$ m/sec. which is sufficient for practical applications.

Next, description will be directed to the pull-in or lock of the phase-locked loop circuit 11 to the servo signal and phase matching of the gate signal generated by the gate circuit 9 with the servo signal.

In the pit type optical disc where separation between the data pit and the servo pit is unavoidably required, the relation between the gate period for the separation of the servo signal and the periodical interval between the servo areas determines the maximum seek speed. For example, when the seek speed becomes excessively high, the data pits falls within the period for separating the servo signal. By increasing the interval or period between the servo areas (gap length) with the gate period being shortened, the marginal seek speed can be increased.

Upon performing the data reproducing operation or the high-speed access operation, rotation of the optical disc is first started, which is then followed by the tracking control. However, in precedence to the tracking control, initialization is performed.

Before the initialization, the phase-locked loop circuit 11 generates the clock with a given phase, wherein the gate signal having the period T is generated from the clock signal. At the timing of this gate signal, the gate circuit 9 separates a part of the output signal of the binary digitizing circuit 8. At that time, the phase-locked loop circuit 11 makes decision as to whether or not the separated signal is the servo signal. Unless the separated signal is the servo signal, phase of the gate signal is sequentially changed. Once the servo signal is separated by the gate circuit 9, the clock signal is synchronized with the servo signal by the phase-locked loop circuit 11, whereon the initialization has been completed to ensure that the servo signal is correctly sampled and held by the S/H circuit 6. Now, the tracking control can take place.

For enabling the discriminative identification of the servo signal in the phase-locked loop (PLL) circuit 11, there may be mentioned following methods:

(1) The servo pits in the servo area are disposed in a pattern differing from that of the data pits (differing, for example, in respect to the inter-pit interval), wherein a pattern matching is adopted for the discrimination. Although this method involves an increase in redundancy because of enlarged servo area, advantage of less susceptibility to defect or fault can be obtained.

(2) Data of a specific pattern is recorded in the data area. This method is incapable of identifying straightforwardly the servo signal. The gate signal is so adjusted in phase that this specific pattern is separated by the gate circuit 9. When the specific pattern as separated is identified through the phase matching or the like procedure, adjustment is then performed such that phase of the gate signal matches with that of the servo signal. Pits constituting the specific pattern data may be provided distributed discretely over several data areas for enhancing the data efficiency. In that case, when all the pits constituting the specific pattern data are obtained by the separation, the gate signal is adjusted to be in phase with the servo signal.

As will now be appreciated from the foregoing description of the illustrated embodiments, it is possible according to the teachings of the present invention to detect the number of tracks on the optical disc traversed by the light spot with a resolution equivalent to one track without need for additional information for the servo area to thereby permit a high-speed access operation of the optical disc which is designed to undergo the sample servo type tracking control, whereby the accuracy for detection of the light spot position can be increased. Besides, the position detection accuracy can be maintained high even in the high-speed seek operation of the light spot. Thus, the high-speed access operation can be realized rapidly with an improved accuracy to excellent advantage.

We claim:

1. An optical disc, comprising:
   a plurality of optical readable tracks including servo areas each having recorded therein servo pits containing clock synchronization information periodically disposed in each track, and
   wherein said servo areas are sequentially shifted by an integral multiple of a periodic clock duration by clock pits generated from a clock synchronization signal.

2. An optical disc according to claim 1 wherein a distance intervening between said servo areas disposed on the same track corresponds to a predetermined periodic duration set by said periodic clock duration.

3. An optical disc according to claim 1, wherein said servo area includes wobble pits for the purpose of tracking control.

4. An optical disc according to claim 1, wherein a portion of a data area existing on the same track between said servo areas to be written with data has synchronization pull-in areas in which a supplemental clock synchronization signal is recorded.

5. An optical disc according to claim 1, said tracks being disposed concentrically with one another, wherein among the tracks located adjacent to one another in the radial direction of said disc, the servo areas formed on said tracks are sequentially offset by a predetermined translational shift relative to those formed on each of the radially inner adjacent tracks in the direction in which said optical disc is scanned.

6. An optical disc according to claim 1, said tracks being formed in a helical pattern so as to evolve from the center of said optical disc in the direction toward the outer periphery thereof, wherein a length of servo area in a track of said tracks is adjusted so as to be an integral multiple of said clock duration t, said length of servo area to be a division of a length obtained by extracting length of said shift of servo areas of adjacent tracks from a length of one revolution of aid track, and said length of servo area to be longer than said amount of shift.

7. An apparatus for reading an optical disc in which servo area each recording therein servo pits containing at least clock information are periodically disposed in each track of a plurality of tracks, said servo areas being sequentially shifted in the longitudinal direction of said track relative to those disposed on the radially inner adjacent track, including rotational driving means for rotating said optical disc at a constant angular sped, and optical head moving means for moving an optical head in the direction radially of said optical disc for detecting signals from said optical disc, said apparatus further comprising:

gate means for detecting a servo signal from a detection signal outputted from said optical head moving in the radial direction of the rotating optical disc and detecting a clock pit signal from said detection signal by using a gate timing adjusted in accordance with a seek speed, clock generating means for generating a clock signal synchronized with the detected servo signal;

a counter for counting said clock signals and detecting said seek speed from a duration of said clock pit signal;

a control circuit for generating a speed control signal on the basis of the count value of said counter at the timing with which said servo signal is detected by said gate means; and wherein the speed of said optical head moving in the direction radially of said optical disc is controlled by said speed control signal.

* * * * *